(12) United States Patent
Nishio et al.

(10) Patent No.: US 9,151,948 B2
(45) Date of Patent: Oct. 6, 2015

(54) CURVATURE VARIABLE MIRROR, CURVATURE VARIABLE UNIT, AND MANUFACTURING METHOD OF CURVATURE VARIABLE MIRROR

(75) Inventors: Akinori Nishio, Chiyoda-ku (JP);
Tomohiko Ishizuka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/387,313

(22) PCT Filed: Mar. 29, 2012

(86) PCT No.: PCT/JP2012/058469
§ 371 (c)(1),
(2), (4) Date: Sep. 23, 2014

(87) PCT Pub. No.: WO2013/145244
PCT Pub. Date: Oct. 3, 2013

(65) Prior Publication Data
US 2015/0092287 A1    Apr. 2, 2015

(51) Int. Cl.
*G02B 26/08* (2006.01)
*G02B 5/10* (2006.01)
*G02B 26/06* (2006.01)
*G02B 7/18* (2006.01)

(52) U.S. Cl.
CPC .............. *G02B 26/0825* (2013.01); *G02B 5/10* (2013.01); *G02B 7/1815* (2013.01); *G02B 26/06* (2013.01)

(58) Field of Classification Search
CPC ........................ G02B 26/0825; G02B 7/1815
USPC ................................... 359/845, 846, 848, 900
See application file for complete search history.

(56) References Cited

U.S. PATENT DOCUMENTS

| | | | |
|---|---|---|---|
| 4,143,946 | A | 3/1979 | Leo et al. |
| 4,198,248 | A | 4/1980 | Mandigo et al. |
| 5,777,807 | A | 7/1998 | Bar et al. |
| 6,398,372 | B1 | 6/2002 | Okada |
| 2001/0008469 | A1 | 7/2001 | Bar et al. |

(Continued)

FOREIGN PATENT DOCUMENTS

| | | |
|---|---|---|
| JP | 59-193233 A | 11/1984 |
| JP | 61-258463 A | 11/1986 |

(Continued)

OTHER PUBLICATIONS

International Search Report of PCT/JP2012/058469 dated May 22, 2012.

(Continued)

*Primary Examiner* — Frank Font
(74) *Attorney, Agent, or Firm* — Sughrue Mion, PLLC; Richard C. Turner

(57) ABSTRACT

A curvature variable mirror includes a mirror base material that is configured such that the curvature is variable and that reflects laser light on the mirror reflective surface side, wherein the mirror base material is formed by using spring-material copper alloy, and the spring-material copper alloy is constituted by using any of phosphor bronze, copper-nickel-zinc alloy, chromium copper, zirconium copper, titanium copper alloy, copper-nickel alloy, and alloy obtained by adding at least one of Ni (nickel), Sn (tin), Si (silicone), Mg (magnesium), Zn (zinc), Mn (manganese), Pb (lead), Fe (iron), and Al (aluminum) to copper.

13 Claims, 4 Drawing Sheets

(56) References Cited

U.S. PATENT DOCUMENTS

| | | | |
|---|---|---|---|
| 2004/0233553 A1 | 11/2004 | Shibata et al. | |
| 2009/0122428 A1* | 5/2009 | Phillips et al. | 359/846 |
| 2009/0122429 A1* | 5/2009 | Watson et al. | 359/846 |
| 2012/0229882 A1* | 9/2012 | Fish et al. | 359/267 |
| 2013/0128333 A1* | 5/2013 | Agrawal et al. | 359/273 |

FOREIGN PATENT DOCUMENTS

| | | |
|---|---|---|
| JP | 06-240389 A | 8/1994 |
| JP | 09-293915 A | 11/1997 |
| JP | 2000-052077 A | 2/2000 |
| JP | 2000-241613 A | 9/2000 |
| JP | 3167977 B2 | 5/2001 |
| JP | 2001-249288 A | 9/2001 |
| JP | 3217640 B2 | 10/2001 |
| JP | 2003-262803 A | 9/2003 |
| JP | 2004-109478 A | 4/2004 |
| JP | 2004-347753 A | 12/2004 |
| JP | 2009-229686 A | 10/2009 |
| JP | 4495251 B1 | 6/2010 |

OTHER PUBLICATIONS

Notification of Reason for Refusal of JP 2013-501059 dated Feb. 26, 2013.

Communication dated Apr. 28, 2015 from the German Patent and Trademark Office in counterpart application No. 112012006138.1.

* cited by examiner

CURVATURE VARIABLE MIRROR, CURVATURE VARIABLE UNIT, AND MANUFACTURING METHOD OF CURVATURE VARIABLE MIRROR

CROSS REFERENCE TO RELATED APPLICATIONS

This is a National Stage of International Application No. PCT/JP2012/058469 filed Mar. 29, 2012, the contents of which are incorporated herein by reference in their entirety.

FIELD

The present invention relates to a curvature variable mirror that reflects laser light, a curvature variable unit, and a manufacturing method of the curvature variable mirror.

BACKGROUND

A laser machining device is a device that reflects laser light emitted from a laser oscillator off a curvature variable mirror, a laser-light reflecting mirror, or other mirrors to irradiate a workpiece with the laser light. Oxygen-free copper has a high heat conductivity, and therefore has been used conventionally for a mirror base material that constitutes the curvature variable mirror or other mirrors. When distortion occurs in the mirror base material described above, a desired beam diameter cannot be obtained. Therefore, there is a need for a mirror base material that prevents the occurrence of distortion.

For example, a variable shape mirror described in Patent Literature 1 uses a metal material such as phosphor bronze as a material of a support spring that couples the variable shape mirror with a support body. This prevents the occurrence of abnormal deformation of such an elastic member.

CITATION LIST

Patent Literature

Patent Literature 1: Japanese Patent Application Laid-open No. 2003-262803

SUMMARY

Technical Problem

However, in the conventional technology mentioned above, phosphor bronze is merely used as a material of the support spring, and a curvature variable mirror has a short life for plastic deformation of the mirror. Therefore, there is a problem in that when a repetitive stress is applied to the curvature variable mirror by repetitive bending, permanent distortion occurs in a mirror base material of the curvature variable mirror, and accordingly the mirror base material needs to be replaced every short period of time.

The present invention has been achieved to solve the above problems, and an object of the present invention is to obtain a curvature variable mirror that has an extended life for plastic deformation of the mirror, a curvature variable unit, and a manufacturing method of the curvature variable mirror.

Solution to Problem

In order to solve above-mentioned problems and achieve the object, the present invention relates to a curvature variable mirror including a mirror base material that is configured such that a curvature is variable and that reflects laser light on a mirror reflective surface side, wherein the mirror base material is formed by using spring-material copper alloy, and the spring-material copper alloy is any of phosphor bronze, copper-nickel-zinc alloy, chromium copper, zirconium copper, titanium copper alloy, copper-nickel alloy, and alloy obtained by adding at least one of Ni, Sn, Si, Mg, Zn, Mn, Pb, Fe, and Al to copper.

Advantageous Effects of Invention

An effect is obtained where the curvature variable mirror, the curvature variable unit, and the manufacturing method of the curvature variable mirror according to the present invention have an extended life for plastic deformation of the mirror.

BRIEF DESCRIPTION OF DRAWINGS

FIG. 4-1 is an explanatory diagram of a relationship between a change in the curvature of a curvature variable mirror and a change in a focus position (part 1).

FIG. 4-2 is an explanatory diagram of a relationship between a change in the curvature of a curvature variable mirror and a change in a focus position (part 2).

DESCRIPTION OF EMBODIMENTS

Exemplary embodiments of a curvature variable mirror, a curvature variable unit, and a manufacturing method of a curvature variable mirror according to the present invention will be explained below in detail with reference to the drawings. The present invention is not limited to the embodiments.

First Embodiment

Figure 1:
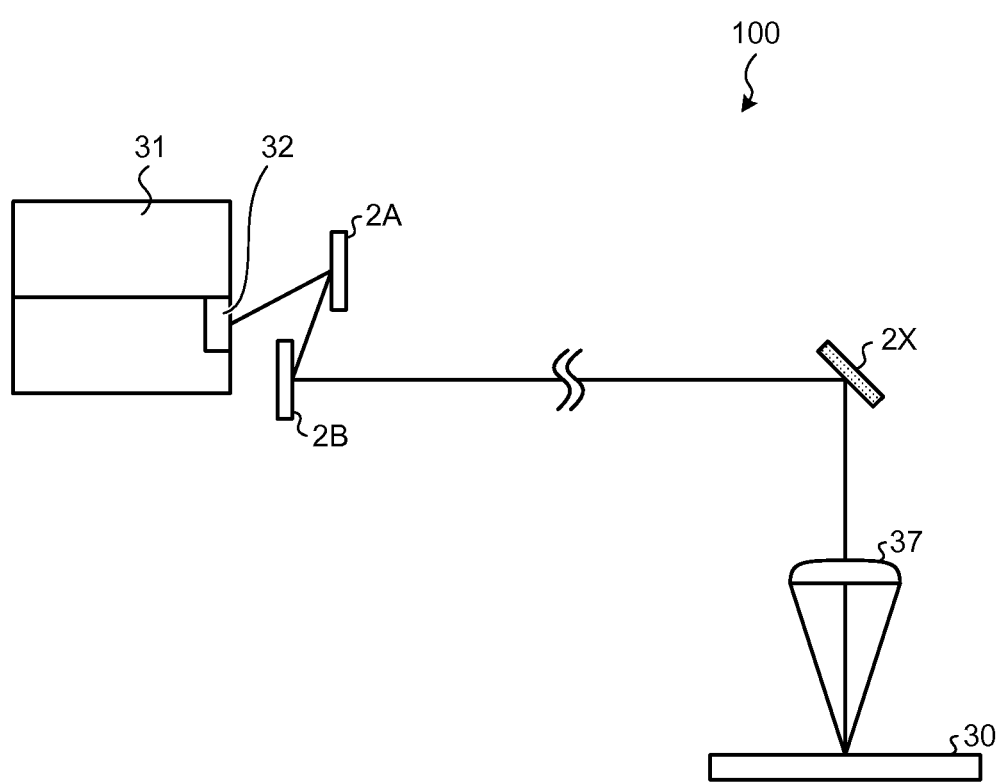
FIG. 1 is a diagram showing a schematic configuration of a laser machining device according to a first embodiment.

FIG. 1 is a diagram showing a schematic configuration of a laser machining device according to a first embodiment. A laser machining device 100 is configured to include a laser oscillator (a laser-light output unit) 31, a PR (partial reflection) mirror 32, bend mirrors 2A and 2B, a curvature variable mirror 2X, and a machining lens 37. In FIG. 1, a configuration of a curvature variable unit 10 described later is omitted.

The laser oscillator 31 is a device that oscillates laser light (beam light) of a $CO_2$ laser or the like. At the time of laser machining, the laser oscillator 31 emits laser light, while varying an output of the laser light. The PR mirror (the partial reflection mirror) 32 partially reflects laser light emitted from the laser oscillator 31 and guides the laser light to the bend mirror 2A.

The bend mirrors (beam-angle changing mirrors) 2A and 2B are mirrors for changing the beam angle. The bend mirror 2A changes the beam angle of laser light transmitted from the PR mirror 32 and guides the laser light to the bend mirror 2B. The bend mirror 2B deflects the beam angle of the laser light transmitted from the bend mirror 2A and transmits the laser light to the curvature variable mirror 2X.

The curvature variable mirror 2X is a mirror that is configured such that the mirror curvature is variable and that reflects laser light off its mirror reflective surface. The curvature variable mirror 2X changes the beam angle, the beam diameter, and the like of laser light transmitted from the bend mirror 2B and transmits the laser light to the machining lens 37. The curvature variable mirror 2X changes the beam diameter, the depth of focus, and the like by changing the mirror curvature. In the curvature variable mirror 2X according to the present embodiment, its mirror base material is formed by using spring-material copper alloy.

The machining lens 37 focuses laser light transmitted from the curvature variable mirror 2X onto a small spot diameter and irradiates a workpiece 30 with the laser light. The workpiece 30 is placed on a machining table (not shown) and is subjected to laser machining on this machining table.

The laser machining device 100 can be a laser machining device that cuts a plate member such as sheet metal or can be a laser machining device that drills a printed circuit board. The laser machining device 100 can perform two-dimensional laser machining or can perform three-dimensional laser machining.

Figure 2:
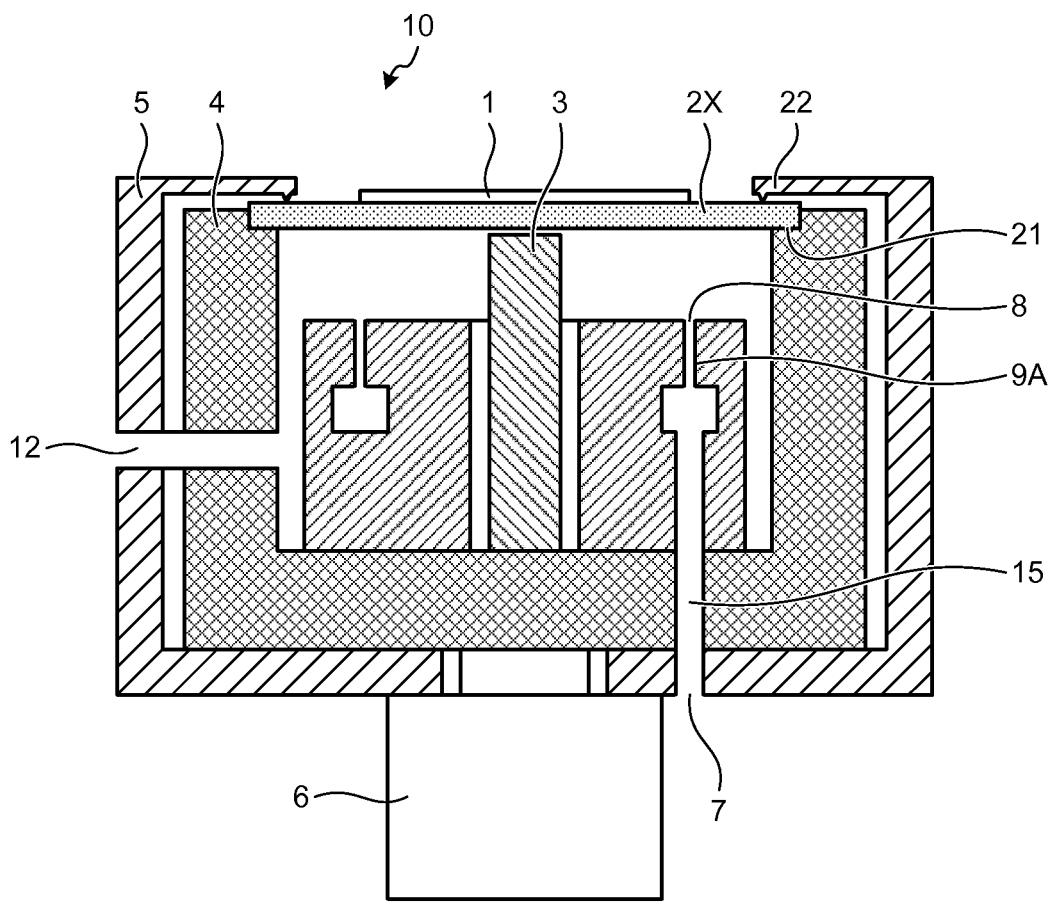
FIG. 2 is a diagram showing a curvature variable unit that includes a curvature variable mirror according to the first embodiment.

FIG. 2 is a diagram showing a curvature variable unit that includes a curvature variable mirror according to the first embodiment. FIG. 2 depicts a cross-sectional view of the curvature variable unit 10. The curvature variable unit 10 is a unit that changes the curvature of the curvature variable mirror 2X that is formed by using a substantially disk-shaped member.

The curvature variable unit 10 includes a sensor 3, an inner mirror support body 4, an outer mirror support body 5, an actuator 6, a fluid inlet 7, a fluid outlet 8, an upstream-side fluid pipe 15, and a downstream-side fluid pipe 9A. Each of the inner mirror support body 4 and the outer mirror support body 5 is configured by using a bottomed cylindrical member. Among these constituent elements, the fluid inlet 7, the fluid outlet 8, the upstream-side fluid pipe 15, and the downstream-side fluid pipe 9A function as a fluid spray mechanism that sprays fluid on the curvature variable mirror 2X.

The inner mirror support body 4 includes a support portion 21 on the top-surface side of the side wall surface that constitutes the bottomed cylindrical member. The support portion 21 comes into contact with the curvature variable mirror 2X at the outer peripheral portion of the bottom surface of the curvature variable mirror 2X.

The inner wall surface of the outer mirror support body 5 is formed larger than the outer wall surface of the inner mirror support body 4. The outer mirror support body 5 is arranged outside the inner mirror support body 4 so as to surround the inner mirror support body 4. The outer mirror support body 5 includes a ring-shaped plate member on the top-surface side of the bottomed cylindrical member. The ring-shaped plate member is joined to the side wall surface so as to be perpendicular to the side wall surface. A pressing portion 22 is provided on the bottom-surface side of the ring-shaped plate member. The pressing portion 22 comes into contact with the curvature variable mirror 2X at the outer peripheral portion of the top surface of the curvature variable mirror 2X. The support portion 21 and the pressing portion 22 are configured such that the support portion 21 comes into contact with the curvature variable mirror 2X on the further outer peripheral side of the curvature variable mirror 2X relative to the pressing portion 22.

With this configuration, the curvature variable mirror 2X is sandwiched between the inner mirror support body 4 and the outer mirror support body 5. Specifically, in the curvature variable mirror 2X, the outer peripheral portion on the bottom-surface side is pressed against the support portion 21 of the inner mirror support body 4 and the outer peripheral portion on the top-surface side is pressed against the pressing portion 22 of the outer mirror support body 5.

The actuator 6 moves the inner mirror support body 4 in a direction vertical to the principal surface of the curvature variable mirror 2X. When the curvature of the curvature variable mirror 2X is changed, the actuator 6 moves the inner mirror support body 4 toward the curvature variable mirror 2X. Therefore, the bottom surface of the curvature variable mirror 2X is pressed up by the support portion 21 and the top surface of the curvature variable mirror 2X is pressed against the pressing portion 22. As a result, the curvature variable mirror 2X is deformed into a concave shape (a bowl shape), thereby changing the curvature. In the curvature variable unit 10, the curvature variable mirror 2X can also be deformed into a convex shape.

The sensor 3 is arranged on the bottom-surface side of the curvature variable mirror 2X and detects the curvature of the curvature variable mirror 2X. In the curvature variable unit 10, the fluid inlet 7 is provided on the bottom-surface side. Through the fluid inlet 7, gas, such as cooling air, to be sprayed on the bottom-surface side of the curvature variable mirror 2X, flows into the curvature variable unit 10.

The upstream-side fluid pipe 15 is, for example, one pipe through which gas, having flowed in from the fluid inlet 7, flows toward the downstream-side fluid pipe 9A. In the curvature variable unit 10, one or a plurality of downstream-side fluid pipes 9A are arranged. Each of the downstream-side fluid pipes 9A is connected to the upstream-side fluid pipe 15. The downstream-side fluid pipe 9A is a pipe through which gas, having been delivered from the upstream-side fluid pipe 15, is delivered toward the fluid outlet 8.

The upstream-side fluid pipe 15 and the downstream-side fluid pipe 9A penetrate through the bottom surface of the inner mirror support body 4 and the bottom surface of the outer mirror support body 5 and extend to the bottom-surface side of the curvature variable mirror 2X. The upstream-side fluid pipe 15 and the downstream-side fluid pipe 9A extend in a direction substantially vertical to the principal surface of the curvature variable mirror 2X. The upstream-side fluid pipe 15 and the downstream-side fluid pipe 9A can have any shape, take any route, and be arranged at any position.

The fluid outlet 8 sprays gas delivered from the downstream-side fluid pipe 9A on the bottom surface of the curvature variable mirror 2X. The downstream-side fluid pipe 9A and the fluid outlet 8 according to the present embodiment are arranged at a position, where gas can be sprayed on the vicinity of the outer peripheral portion of the curvature variable mirror 2X (near the outer peripheral portion of the curvature variable mirror 2X). In other words, the downstream-side fluid pipe 9A and the fluid outlet 8 are arranged so as not to spray gas on the central area of the curvature variable mirror 2X but to spray gas on the outer peripheral area of the curvature variable mirror 2X.

Gas having flowed in from the fluid inlet 7 is delivered from the fluid inlet 7 to the upstream-side fluid pipe 15 and flows out of the fluid outlet 8 through the upstream-side fluid pipe 15 and the downstream-side fluid pipe 9A. Therefore, the gas having flowed out of the fluid outlet 8 is sprayed on the vicinity of the outer peripheral portion on the bottom-surface side of the curvature variable mirror 2X. The gas, having been sprayed on the bottom surface of the curvature variable mirror 2X, is discharged from a discharge port 12 provided on the side-surface side of the curvature variable unit 10. The discharge port 12 can be provided on the bottom-surface side of the curvature variable unit 10.

Figure 3:
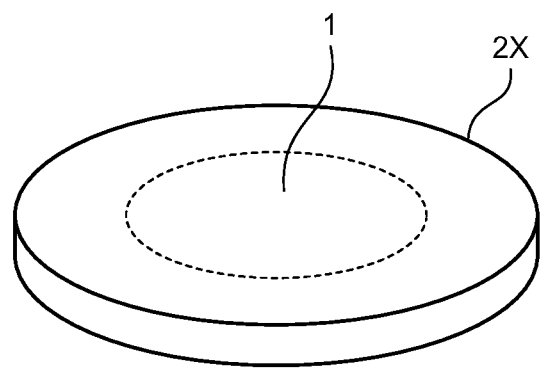
FIG. 3 is a diagram showing a configuration of the curvature variable mirror according to the first embodiment.

FIG. 3 is a diagram showing a configuration of the curvature variable mirror according to the first embodiment. FIG. 3 depicts a perspective view of the curvature variable mirror 2X. The curvature variable mirror 2X is configured by using a substantially disk-shaped mirror base material. A reflective film 1 is formed on a circular area on the mirror reflective surface side. The center of the reflective film 1 substantially corresponds to the center of the mirror reflective surface of the mirror base material. The reflective film 1 can be formed on an area smaller than the mirror reflective surface or can be formed on the same area as the mirror reflective surface.

In the present embodiment, spring-material copper alloy with a 0.2% proof stress and better stress relaxation properties is used for the curvature variable mirror 2X (the mirror base material) in order to extend the life of the curvature variable mirror 2X for plastic deformation of the mirror. For example, the spring-material copper alloy is any of phosphor bronze, copper-nickel-zinc alloy, chromium copper, zirconium copper, titanium copper alloy, copper-nickel alloy, and alloy obtained by adding one or more of Ni (nickel), Sn (tin), Si (silicone), Mg (magnesium), Zn (zinc), Mn (manganese), Pb (lead), Fe (iron), and Al (aluminum) to copper.

As described above, in the present embodiment, the spring-material copper alloy such as phosphor bronze is used for a mirror base material of the curvature variable mirror 2X. Therefore, the curvature variable mirror 2X can obtain better durability against plastic deformation caused by a repetitive stress.

It is generally desirable that a mirror base material for a high-output laser is configured to suppress a temperature increase. Therefore, in the present embodiment, a dielectric multi-layer film is used as the reflective film 1. The curvature variable mirror 2X increases the reflection of laser light by using the dielectric multi-layer film, in order to suppress a temperature increase caused by a heat input of the laser light. Therefore, even when the heat conductivity of copper alloy is low, it is still possible to suppress a temperature increase in the curvature variable mirror 2X.

In the present embodiment, gas is sprayed on the curvature variable mirror 2X from the back side of the mirror reflective surface (from the bottom-surface side of the curvature variable mirror 2X) so as to efficiently reduce the mirror temperature. Therefore, a temperature increase in the curvature variable mirror 2X can be suppressed.

To suppress a temperature increase in the curvature variable mirror 2X, both or either of providing the reflective film 1 and spraying gas from the back side of the mirror reflective surface can be performed.

For example, when gas is sprayed toward the central portion of the curvature variable mirror 2X, a large cooling effect can be obtained. However, the temperature distribution in the curvature variable mirror 2X becomes non-uniform. Specifically, the mirror-temperature distribution becomes a non-uniform temperature distribution in which the central portion of the curvature variable mirror 2X is at a medium temperature, the area between the central portion and the outer peripheral portion is at a high temperature, and the outer peripheral portion is at a low temperature. Therefore, a curved mirror surface of the curvature variable mirror 2X deviates from a desired curved surface, thereby affecting the laser light properties.

Meanwhile, in the present embodiment, gas is sprayed from the back-surface side of the mirror reflective surface on the vicinity of the outer peripheral portion on the back side. Therefore, it is possible to decrease the temperature of the curvature variable mirror 2X, while maintaining the temperature distribution in the curvature variable mirror 2X, which is generated by irradiation of laser light. Specifically, the mirror-temperature distribution becomes a uniform temperature distribution in which the central portion of the curvature variable mirror 2X is at a high temperature, the area between the central portion and the outer peripheral portion is at a medium temperature, and the outer peripheral portion is at a low temperature.

In a case where an output of laser light that enters the curvature variable mirror 2X is low, it suffices that formation of the reflective film 1 is omitted and gold can only be evaporated onto the mirror reflective surface. In this case, a thin film of gold is formed on the mirror reflective surface at the position of the reflective film 1.

The curvature variable mirror 2X can change the focus position of laser light for irradiating the workpiece 30 by changing the curvature. A relationship between a change in the curvature of the curvature variable mirror 2X and a change in a focus position is explained below.

Figures 1, 4:
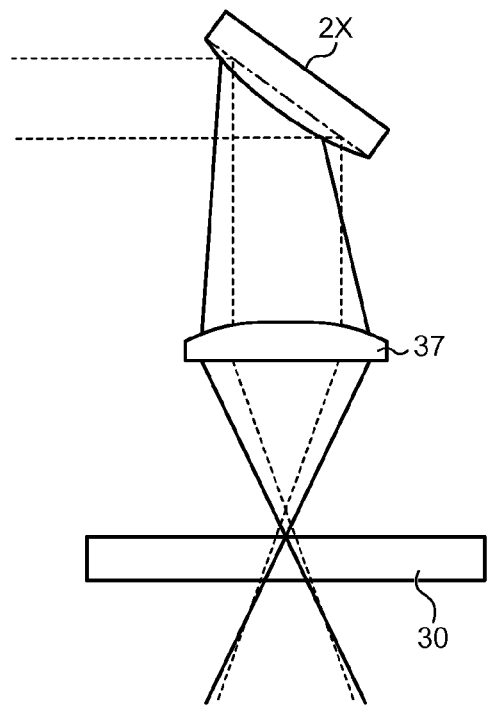
Figures 2, 4:
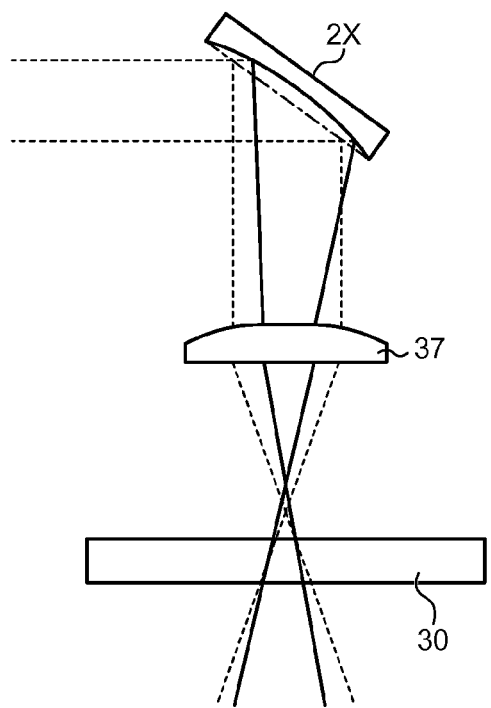

FIGS. 4-1 and 4-2 are explanatory diagrams of a relationship between a change in the curvature of a curvature variable mirror and a change in a focus position. FIG. 4-1 depicts a case where the curvature variable mirror 2X has a convex surface. FIG. 4-2 depicts a case where the curvature variable mirror 2X has a concave surface.

As shown in FIG. 4-1, the focal length of laser light for irradiating the workpiece 30 through the convex surface of the curvature variable mirror 2X becomes longer than the case where the workpiece 30 is irradiated with parallel laser-light. When laser light is reflected off the convex surface of the curvature variable mirror 2X, the beam diameter of the laser light becomes larger after the reflection than the beam diameter before the reflection.

In contrast, as shown in FIG. 4-2, the focal length of laser light for irradiating the workpiece 30 through the concave surface of the curvature variable mirror 2X becomes shorter than the case where the workpiece 30 is irradiated with parallel laser-light. When laser light is reflected off the concave surface of the curvature variable mirror 2X, the beam diameter of the laser light becomes smaller after the reflection than the beam diameter before the reflection.

As described above, by changing the curvature of the curvature variable mirror 2X, it is possible to change the focus position of laser light for irradiating the workpiece 30 in the same way as when the position of the machining lens 37 is changed. Furthermore, by changing the curvature of the curvature variable mirror 2X, it is possible to change the beam diameter of laser light before and after the reflection.

In general optics such as a curvature variable mirror, a mirror reflective surface is required to have high surface accuracy so that the optical properties do not change. To obtain a desired curvature by bending a curvature variable mirror with a low load, it is more advantageous to reduce the thickness of the curvature variable mirror. In a case where spring-material copper alloy such as phosphor bronze is used for the curvature variable mirror, it is sometimes difficult to obtain desired surface accuracy due to a residual stress generated at the time of material manufacturing and a small thickness of the mirror. In this case, the yield and productivity of the curvature variable mirror are significantly degraded.

Therefore, in the present embodiment, when the curvature variable mirror 2X is manufactured, a residual stress is released by annealing a raw material of the mirror. It is possible to use hardness as a criterion for determining the degree of releasing a residual stress for ensuring the yield and productivity. In the present embodiment, the raw base material of the mirror is annealed to be softened to a Rockwell (B-scale) hardness of HRB80 or lower. The raw material of the mirror, having been softened to HRB80 or lower, is used as a material for the mirror base material. This facilitates cutting of the raw material of the mirror, and therefore makes it possible to easily manufacture the curvature variable mirror 2X.

As described above, in the present embodiment, the curvature variable mirror 2X is configured by using spring-material copper alloy such as phosphor bronze. Depending on the heat conductivity of a raw material of the mirror, it is desirable to provide a dielectric multi-layer film (the reflective film 1) on a mirror reflective surface in order to increase the reflection of laser light. Furthermore, depending on the heat conductivity of a raw material of the mirror, it is desirable to spray fluid on the back-surface side of the mirror reflective surface in order to suppress an increase in the mirror temperature.

As described above, the curvature variable mirror 2X uses spring-material copper alloy with a 0.2% proof stress and better stress relaxation properties for its mirror base material. Therefore, even when a repetitive stress is applied to the curvature variable mirror 2X by repetitive bending, permanent distortion hardly occurs in the curvature variable mirror 2X. The dielectric multi-layer film, which has higher laser-light reflectivity than gold, is formed on the mirror reflective surface. Therefore, it is possible to efficiently suppress a temperature increase in the curvature variable mirror 2X.

The curvature of the curvature variable mirror 2X is changed by using the support portion 21 and the pressing portion 22. Therefore, the curvature of the curvature variable mirror 2X can be changed to a desired value even when the mirror is thick. Accordingly, the curvature variable mirror 2X is capable of suppressing heat distortion even when high-output laser enters the curvature variable mirror 2X.

The shape of the curvature variable mirror 2X is not limited to a substantially disk shape and can be any shape. For example, the curvature variable mirror 2X can be formed from a plate member with a polygonal principal surface or from an elliptical plate member. Furthermore, a hollow area can be provided on the bottom-surface side of or within the curvature variable mirror 2X.

Figure 5:
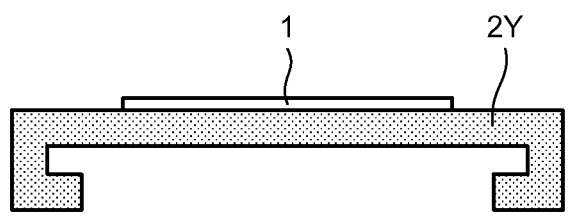
FIG. 5 is a diagram showing another configuration example of a curvature variable mirror.

FIG. 5 is a diagram showing another configuration example of a curvature variable mirror. A curvature variable mirror 2Y has a configuration in which a hollow area is provided on the bottom-surface side of a mirror base material or within the mirror. The curvature variable unit 10 can suppress a temperature increase in the curvature variable mirror 2Y by spraying fluid such as gas or liquid to flow into the hollow area of the curvature variable mirror 2Y. Furthermore, the curvature variable mirror 2Y is configured to change the mirror curvature by fluid that flows into the hollow area. In the curvature variable mirror 2Y, a mirror reflective surface is deformed into a convex surface or a concave surface by changing the pressure of fluid that flows into the hollow area.

The configuration of the curvature variable unit 10 for varying the curvature of the curvature variable mirror 2X is not limited to the configuration explained in FIG. 2 and the like. For example, the inner mirror support body 4, the outer mirror support body 5, the support portion 21, and the pressing portion 22 can have any structure and be driven by any method.

The curvature shape of a mirror surface of the curvature variable mirror 2X can be either a spherical shape or an aspherical shape. The scope of application of the curvature variable mirror 2X is not limited to a laser machining device. The curvature variable mirror 2X can be applied to any device.

The curvature variable mirror 2X can be applied to the bend mirrors 2A and 2B. It suffices that a dielectric multi-layer film is not formed on the curvature variable mirror 2X. It suffices that cooling of the curvature variable mirror 2X by spraying gas thereon is omitted. Gas can be sprayed on any area of the curvature variable mirror 2X in any direction.

As described above, according to the first embodiment, a mirror base material of the curvature variable mirror 2X is made of spring-material copper alloy such as phosphor bronze. Therefore, it is possible for the curvature variable mirror 2X to achieve an extended life for plastic deformation.

Because gas is sprayed on the vicinity of the outer peripheral portion on the back-surface side of a mirror reflective surface, it is possible to suppress an increase in the mirror temperature, while maintaining the temperature distribution in the mirror surface. Because a raw material of the mirror is annealed to be softened to HRB80 or lower, it is possible to easily manufacture the curvature variable mirror 2X. Because the dielectric multi-layer film (the reflective film 1) is formed on the mirror reflective surface, it is possible to increase the reflection of laser light. As a result, it is possible to suppress an increase in the mirror temperature.

Second Embodiment

Next, a second embodiment of the present invention is explained with reference to FIG. 6. In the second embodiment, a downstream-side fluid pipe of a curvature variable unit is arranged in an inclined manner so as to spray gas on the curvature variable mirror 2X in a direction oblique to the curvature variable mirror 2X.

Figure 6:
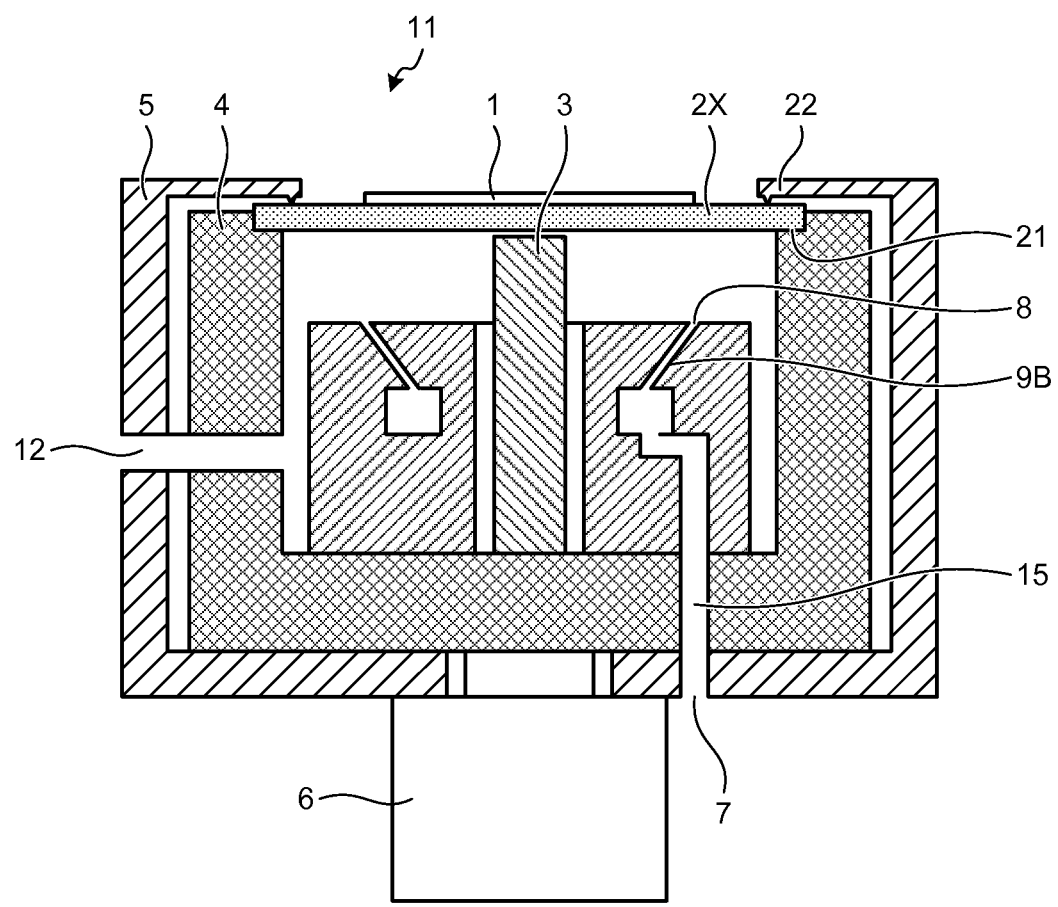
FIG. 6 is a diagram showing a curvature variable unit including a curvature variable mirror according to a second embodiment.

FIG. 6 is a diagram showing the curvature variable unit including a curvature variable mirror according to the second embodiment. FIG. 6 depicts a cross-sectional view of a curvature variable unit 11. Among the respective constituent elements shown in FIG. 6, elements achieving functions identical to those of the curvature variable unit 10 according to the first embodiment and shown in FIG. 2 are denoted by the same reference signs and redundant explanations thereof will be omitted.

The curvature variable unit 11 includes the sensor 3, the inner mirror support body 4, the outer mirror support body 5, the actuator 6, the fluid inlet 7, the fluid outlet 8, the upstream-side fluid pipe 15, and a downstream-side fluid pipe 9B. In other words, as compared to the curvature variable unit 10, the curvature variable unit 11 includes the downstream-side fluid pipe 9B instead of the downstream-side fluid pipe 9A. Among these constituent elements, the fluid inlet 7, the fluid outlet 8, the upstream-side fluid pipe 15, and the downstream-side fluid pipe 9B function as a fluid spray mechanism that sprays fluid on the curvature variable mirror 2X.

In the upstream-side fluid pipe 15 according to the present embodiment, gas having flowed in from the fluid inlet 7 flows toward the downstream-side fluid pipe 9B. In the curvature variable unit 11, one or a plurality of downstream-side fluid pipes 9B are arranged. Each of the downstream-side fluid pipes 9B is connected to the upstream-side fluid pipe 15.

The downstream-side fluid pipe 9B and the fluid outlet 8 are arranged at a position where gas can be sprayed on the vicinity of the outer peripheral portion of the curvature variable mirror 2X. The downstream-side fluid pipe 9B according to the present embodiment is arranged such that its axial direction is oriented obliquely to the principal surface of the curvature variable mirror 2X (to the mirror back surface that is the opposite surface to the mirror reflective surface). Specifically, the downstream-side fluid pipe 9B extends in a direction from the axial center of the inner mirror support body 4 toward the outer peripheral portion of the inner mirror support body 4. In other words, the axial direction of the downstream-side fluid pipe 9B is inclined such that gas can flow in a direction from the inner peripheral side toward the outer peripheral side of the mirror back surface. Therefore, the axial direction of the downstream-side fluid pipe 9B and the direction vertical to the principal surface of the curvature variable mirror 2X are not parallel to each other.

Gas having flowed in from the fluid inlet 7 is delivered from the fluid inlet 7 to the upstream-side fluid pipe 15 and flows out of the fluid outlet 8 through the upstream-side fluid pipe 15 and the downstream-side fluid pipe 9B. Therefore, the gas having flowed out of the fluid outlet 8 is sprayed on the outer peripheral side, while flowing from the inner peripheral side toward the outer peripheral side on the bottom-surface side of the curvature variable mirror 2X. In other words, the fluid spray mechanism sprays fluid on the principal surface of a mirror base material in a direction oblique to the principal surface so that the fluid can flow in a direction from the inner peripheral side toward the outer peripheral side of the mirror back surface.

As described above, according to the second embodiment, fluid is sprayed on the principal surface of the curvature variable mirror 2X in a direction oblique to the principal surface so that the fluid can flow in a direction from the inner peripheral side toward the outer peripheral side of the mirror back surface. Therefore, gas is not sprayed on the central portion of the curvature variable mirror 2X. Accordingly, it is possible to decrease the temperature of the curvature variable mirror 2X, while maintaining the temperature distribution in the curvature variable mirror 2X, which is generated by irradiation of laser light.

INDUSTRIAL APPLICABILITY

As described above, the curvature variable mirror, the curvature variable unit, and the manufacturing method of the curvature variable mirror according to the present invention are suitable for irradiation of laser light.

REFERENCE SIGNS LIST 1 reflective film
2X, 2Y curvature variable mirror
4 inner mirror support body
5 outer mirror support body
6 actuator
8 fluid outlet
9A, 9B downstream-side fluid pipe
10, 11 curvature variable unit
12 discharge port
100 laser machining device

The invention claimed is:

1. A curvature variable mirror comprising a mirror base material that is configured such that a curvature is variable and that reflects laser light on a mirror reflective surface side, wherein
    the mirror base material comprises an annealed copper alloy spring-material, the copper alloy spring-material having a higher hardness than that of oxygen-free copper prior to annealing, and the copper alloy spring-material being annealed to be softened to a Rockwell hardness of HRB80 or lower, and
    the copper alloy spring-material is any of phosphor bronze, copper-nickel-zinc alloy, chromium copper, zirconium copper, titanium copper alloy, copper-nickel alloy, and alloy obtained by adding at least one of Ni, Sn, Si, Mg, Zn, Mn, Pb, Fe, and Al to copper.

2. The curvature variable mirror according to claim 1, wherein a dielectric multi-layer film is formed on a mirror reflective surface side of the mirror base material.

3. A curvature variable mirror comprising a mirror base material that is configured such that a curvature is variable and that reflects laser light on a mirror reflective surface side, wherein
    the mirror base material comprises an annealed copper alloy spring-material, the copper alloy spring-material having a higher hardness than that of oxygen-free copper prior to annealing, and the copper alloy spring-material being annealed is to be softened to a Rockwell hardness of HRB80 or lower, and
    the copper alloy spring-material is any of phosphor bronze, copper-nickel-zinc alloy, chromium copper, zirconium copper, titanium copper alloy, copper-nickel alloy, and alloy obtained by adding at least one of Ni, Sn, Zn, Mn, Pb, Fe, and Al to copper.

4. The curvature variable mirror according to claim 3, wherein a dielectric multi-layer film is formed on a mirror reflective surface side of the mirror base material.

5. A curvature variable unit comprising:
    a curvature variable mirror that includes a mirror base material that is configured such that a curvature is variable and that reflects laser light on a mirror reflective surface side; and
    a fluid spray mechanism that sprays fluid on the mirror base material from a mirror back surface side that is a surface opposite to the mirror reflective surface side, wherein
    the mirror base material comprises an annealed copper alloy spring-material, the copper alloy spring-material having a higher hardness than that of oxygen-free copper prior to annealing, and the copper alloy spring-material being annealed to be softened to a Rockwell hardness of HRB80 or lower, and
    the copper alloy spring-material is any of phosphor bronze, copper-nickel-zinc alloy, chromium copper, zirconium copper, titanium copper alloy, copper-nickel alloy, and alloy obtained by adding at least one of Ni, Sn, Si, Mg, Zn, Mn, Pb, Fe, and Al to copper.

6. The curvature variable unit according to claim 5, wherein the fluid spray mechanism sprays the fluid on an outer peripheral portion of the mirror back surface.

7. The curvature variable unit according to claim 5, wherein the alloy is obtained by adding at least one of Ni, Sn, Si, Mn, Pb, Fe, and Al to copper.

8. A curvature variable unit comprising:
    a curvature variable mirror that includes a mirror base material that is configured such that a curvature is variable and that reflects laser light on a mirror reflective surface side; and
    a fluid spray mechanism that sprays fluid on the mirror base material from a mirror back surface side that is a surface opposite to the mirror reflective surface side, wherein
    the mirror base material comprises an annealed copper alloy spring-material, the copper alloy spring-material having a higher hardness than that of oxygen-free copper prior to annealing, and the copper alloy spring-material being annealed to be softened to a Rockwell hardness of HRB80 or lower, and
    the copper alloy spring-material is any of phosphor bronze, copper-nickel-zinc alloy, chromium copper, zirconium copper, titanium copper alloy, copper-nickel alloy, and alloy obtained by adding at least one of Ni, Sn, Zn, Mn, Pb, Fe, and Al to copper.

9. The curvature variable unit according to claim 8, wherein the fluid spray mechanism sprays the fluid on an outer peripheral portion of the mirror back surface.

10. A curvature variable unit comprising:
- a curvature variable mirror that includes a mirror base material that is configured such that a curvature is variable and that reflects laser light on a mirror reflective surface side; and
- a fluid spray mechanism that sprays fluid on the mirror base material from a mirror back surface side that is a surface opposite to the mirror reflective surface side, wherein
- the mirror base material is formed by using an annealed copper alloy spring-material,
- the copper alloy spring-material is any of phosphor bronze, copper-nickel-zinc alloy, chromium copper, zirconium copper, titanium copper alloy, copper-nickel alloy, and alloy obtained by adding at least one of Ni, Sn, Si, Mg, Zn, Mn, Pb, Fe, and Al to copper, and
- the fluid spray mechanism sprays the fluid on an outer peripheral portion of the mirror back surface in a direction oblique to the outer peripheral portion of the mirror back surface so that the fluid flows in a direction from an inner peripheral side toward an outer peripheral side of the mirror back surface.

11. The curvature variable unit according to claim 10, wherein the copper alloy spring-material has a higher hardness than that of oxygen-free copper prior to annealing, and the copper alloy spring-material being annealed to be softened to a Rockwell hardness of HRB80 or lower.

12. A manufacturing method of a curvature variable mirror, comprising an annealing step of annealing a material of a mirror base material that is configured such that a curvature is variable, that is formed by using copper alloy spring-material that is any of phosphor bronze, copper-nickel-zinc alloy, chromium copper, zirconium copper, titanium copper alloy, copper-nickel alloy, and alloy obtained by adding at least one of Ni, Si, Mg, Sn, Zn, Mn, Pb, Fe, and Al to copper, and that reflects laser light on a mirror reflective surface side, wherein
- the mirror base material is formed by using copper alloy spring-material with a higher hardness than that of oxygen-free copper, and
- at the annealing step, the mirror base material is annealed so as to be softened to a Rockwell hardness of HRB80 or lower.

13. A manufacturing method of a curvature variable mirror, comprising an annealing step of annealing a material of a mirror base material that is configured such that a curvature is variable, that is formed by using copper alloy spring-material that is any of phosphor bronze, copper-nickel-zinc alloy, chromium copper, zirconium copper, titanium copper alloy, copper-nickel alloy, and alloy obtained by adding at least one of Ni, Sn, Zn, Mn, Pb, Fe, and Al to copper, and that reflects laser light on a mirror reflective surface side, wherein
- the mirror base material is formed by using copper alloy spring-material with a higher hardness than that of oxygen-free copper, and
- at the annealing step, the mirror base material is annealed so as to be softened to a Rockwell hardness of HRB80 or lower.

\* \* \* \* \*